US012002289B2

(12) United States Patent
Chen

(10) Patent No.: US 12,002,289 B2
(45) Date of Patent: Jun. 4, 2024

(54) EXPRESSION RECOGNITION METHOD AND APPARATUS, COMPUTER DEVICE, AND READABLE STORAGE MEDIUM

(71) Applicant: BOE Technology Group Co., Ltd., Beijing (CN)

(72) Inventor: Guannan Chen, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 351 days.

(21) Appl. No.: 17/434,424

(22) PCT Filed: Feb. 24, 2021

(86) PCT No.: PCT/CN2021/077705
§ 371 (c)(1),
(2) Date: Aug. 27, 2021

(87) PCT Pub. No.: WO2021/196928
PCT Pub. Date: Oct. 7, 2021

(65) Prior Publication Data
US 2022/0343683 A1  Oct. 27, 2022

(30) Foreign Application Priority Data

Apr. 1, 2020 (CN) .......................... 202010248558.7

(51) Int. Cl.
*G06V 40/16* (2022.01)
*G06N 3/045* (2023.01)
(Continued)

(52) U.S. Cl.
CPC ........... *G06V 40/174* (2022.01); *G06N 3/045* (2023.01); *G06N 3/08* (2013.01); *G06T 7/73* (2017.01);
(Continued)

(58) Field of Classification Search
CPC ............... G06V 40/174; G06V 10/764; G06V 10/7715; G06V 10/778; G06V 10/806;
(Continued)

(56) References Cited

U.S. PATENT DOCUMENTS

2019/0087686 A1* 3/2019 Du ....................... G06V 10/806
2019/0392202 A1* 12/2019 Hong ................... G06V 10/806

FOREIGN PATENT DOCUMENTS

CN      108229268 A   6/2018
CN      109344693 A   2/2019
(Continued)

OTHER PUBLICATIONS

International Search Report for PCT/CN2021/077705 dated May 28, 2021.

*Primary Examiner* — Amandeep Saini
*Assistant Examiner* — Daniella M. DiGuglielmo
(74) *Attorney, Agent, or Firm* — Ling Wu; Stephen Yang; Ling and Yang Intellectual Property

(57) ABSTRACT

An expression recognition method and apparatus, a computer device, and a readable storage medium are provided. The method includes: performing face key-point position detection on a face image to obtain face key-point position information; and obtaining expression class information of the face image using four cascaded convolutional modules and a trained neural network classifier according to the face image and the face key-point position information.

20 Claims, 4 Drawing Sheets

(51) Int. Cl.
*G06N 3/08* (2023.01)
*G06T 7/73* (2017.01)
*G06V 10/764* (2022.01)
*G06V 10/77* (2022.01)
*G06V 10/778* (2022.01)
*G06V 10/80* (2022.01)
*G06V 10/82* (2022.01)

(52) U.S. Cl.
CPC ........ *G06V 10/764* (2022.01); *G06V 10/7715* (2022.01); *G06V 10/778* (2022.01); *G06V 10/806* (2022.01); *G06V 10/82* (2022.01); *G06V 40/161* (2022.01); *G06V 40/171* (2022.01); *G06V 40/172* (2022.01); *G06T 2207/20081* (2013.01); *G06T 2207/20084* (2013.01); *G06T 2207/30201* (2013.01)

(58) Field of Classification Search
CPC .... G06V 10/82; G06V 40/161; G06V 40/171; G06V 40/172; G06T 7/73; G06T 2207/20081; G06T 2207/20084; G06T 2207/30201; Y02D 10/00; G06N 3/08; G06N 3/045
See application file for complete search history.

(56) References Cited

FOREIGN PATENT DOCUMENTS

| | | | | |
|---|---|---|---|---|
| CN | 110163080 A | * | 8/2019 | ......... G06K 9/00228 |
| CN | 110348350 A | * | 10/2019 | ......... G06K 9/00228 |
| CN | 110348350 A | | 10/2019 | |
| CN | 111325190 A | | 6/2020 | |
| JP | 2018-55470 A | | 4/2018 | |

* cited by examiner

EXPRESSION RECOGNITION METHOD AND APPARATUS, COMPUTER DEVICE, AND READABLE STORAGE MEDIUM

CROSS-REFERENCE TO RELATED APPLICATIONS

The present application is a U.S. National Phase Entry of International Application PCT/CN2021/077705 having an international filing date of Feb. 24, 2021, which claims priority of Chinese patent application No. 202010248558.7 filed on Apr. 1, 2020, and entitled "Expression Recognition Method and Apparatus, Computer Device, and Readable Storage Medium", the contents of which should be construed as being hereby incorporated by reference in their entirety.

TECHNICAL FIELD

Embodiments of the present disclosure relate to, but not limited to, the technical field of graphics processing, and particularly to an expression recognition method, an apparatus, a computer device, and a readable storage medium.

BACKGROUND

Nowadays, deep learning technology has been rapidly developed. Some enterprises such as Google, Facebook, and Baidu have put huge capital and human investments in technical researches on deep learning and kept on launching their special products and technologies. Some other enterprises such as the International Business Machines Corporation (IBM), Microsoft, and Amazon have also kept on expanding the field of deep learning and made some achievements.

Breakthroughs have been made in deep learning technology in the field of human data perception, e.g., describing content of an image, recognizing an object in a complex environment in an image, and performing voice recognition in a noisy environment. Problems of image generation and fusion may also be solved by deep learning technology.

As a hotspot technology in biological pattern recognition in recent years, face feature recognition requires detection and positioning of facial feature points of faces and performing face matching, expression analysis, and other applications, based on these feature points. In recent years, many research institutes and enterprises have put huge resource investments in the field of target recognition and made a series of achievements which have also been applied extensively to the industries of security, finance, live entertainment, etc. As an extension of the face feature recognition technology, expression recognition is also one of the difficulties in this field. Due to the complexity of human facial expressions, it is difficult to make a substantive breakthrough in the accuracy of classifying an expression using a machine learning method. The development of deep learning provides more possibilities for improving the performance of image pattern recognition. Therefore, the research of deep learning technology-based expression recognition has also been a hot concern in the field of face feature recognition in recent years.

In most expression recognition methods, a face image is extracted using face key-points, and extracted images of eyes and mouth are enlarged to the size of the face image and input together to a deep learning network for training to obtain a deep learning model for expression recognition. However, such a method is complex in model structure and involves more parameters.

SUMMARY

The following is a summary about the subject matter described in the present disclosure in detail. The summary is not intended to limit the scope of protection of the claims.

A first aspect of the embodiments of the present disclosure provides an expression recognition method, which includes the following steps:

performing face key-point position detection on a face image to obtain face key-point position information;

inputting the face image to four cascaded convolutional modules, and sequentially performing feature processing on the input face image to obtain a feature response map output by a fourth convolutional module of the four cascaded convolutional modules;

inputting the feature response map output by the fourth convolutional module to a global average pooling layer module to obtain a feature vector of a first dimension;

performing key-point feature extraction on feature response maps output by the first three convolutional modules of the four cascaded convolutional modules respectively using the face key-point position information to obtain key-point feature information of the response feature maps output by the first three convolutional modules respectively;

connecting the feature vector of the first dimension with the key-point feature information of the feature response maps output by the first three convolutional modules respectively to obtain a feature vector of a second dimension;

inputting the feature vector of the second dimension to a fully connected layer module, to process the feature vector of the second dimension to obtain a feature vector of a third dimension; and inputting the feature vector of the third dimension to a trained neural network classifier to output expression class information of the face image through the neural network classifier.

A second aspect of the embodiments of the present disclosure provides an expression recognition device, which includes:

a face key-point position detection module, configured to perform face key-point position detection on a face image to obtain face key-point position information;

four cascaded convolutional modules, configured to input the face image and sequentially perform feature processing on the input face image to obtain a feature response map output by a fourth convolutional module of the four cascaded convolutional modules;

a global average pooling layer module, configured to obtain a feature vector of a first dimension according to the input feature response map output by the fourth convolutional module;

a key-point feature information module, configured to perform key-point feature extraction on feature response maps output by the first three convolutional modules of the four cascaded convolutional modules respectively using the face key-point position information to obtain key-point feature information of the response feature maps output by the first three convolutional modules respectively;

a feature vector connecting module, configured to connect the feature vector of the first dimension with the key-point feature information of the feature response maps output by the first three convolutional modules respectively to obtain a feature vector of a second dimension;

a fully connected layer module, configured to process the input feature vector of the second dimension to obtain a feature vector of a third dimension; and a neural network classifier, configured to input the feature vector of the third dimension to a trained neural network classifier to output expression class information of the face image through the neural network classifier.

A third aspect of the embodiments of the present disclosure provides a computer device, which includes a processor and a memory storing a computer program runnable in the processor. The processor executes the program to implement the method as described in the first aspect of the embodiments of the present disclosure.

A fourth aspect of the present disclosure discloses a non-transitory computer-readable storage medium, in which instructions are stored, wherein when the computer-readable storage medium is run on a computer, the computer is enabled to execute the method as described in the first aspect of the embodiments of the present disclosure.

Other aspects may be comprehended upon reading and understanding of the drawings and the detailed descriptions.

BRIEF DESCRIPTION OF DRAWINGS

In order to describe technical solutions in the embodiments of the present disclosure more clearly, the drawings used in the description about the embodiments will now be simply introduced. The drawings in the following description are only some embodiments of the present disclosure. Other drawings may be obtained by those of ordinary skill in the art according to these drawings without inventive effort.

DETAILED DESCRIPTION

In order to make the technical solutions and advantages of the present disclosure clearer, implementation modes of the present disclosure will be described in detail below in combination with the drawings.

Figure 1:
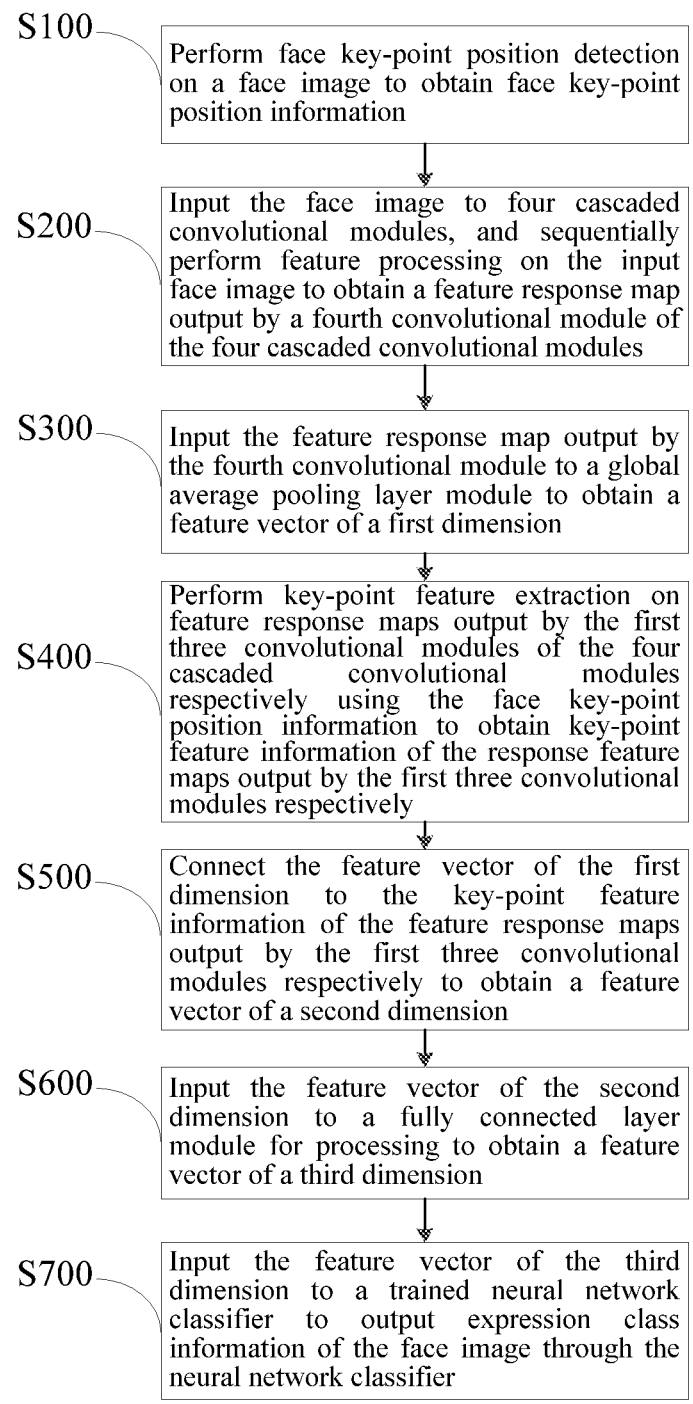
FIG. 1 is a schematic flowchart of an expression recognition method according to an exemplary embodiment of the present disclosure.

FIG. 1 is a flowchart of an expression recognition method according to an exemplary embodiment of the present disclosure. The expression recognition method may be applied to a terminal device. The terminal device may be a smart phone, a tablet computer, a personal computer, a server, or the like. For the ease of understanding, an algorithm structure of the expression recognition method will be briefly introduced below at first.

Figure 2:
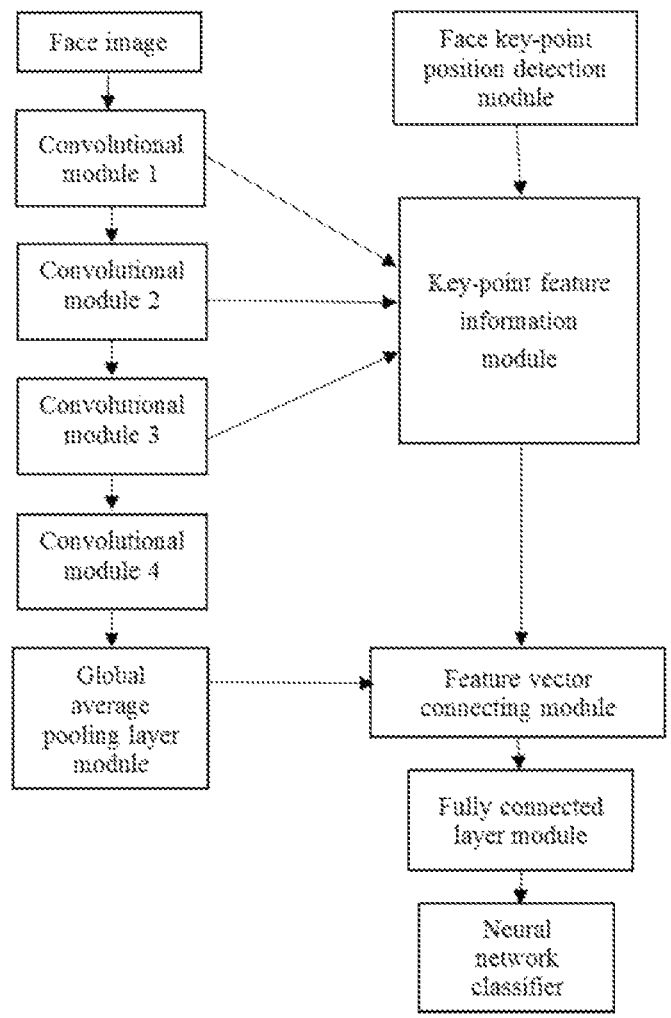
FIG. 2 is a schematic diagram of an algorithm structure of an expression recognition method according to an exemplary embodiment of the present disclosure.

As shown in FIG. 2, an algorithm structure of an expression recognition method in an exemplary embodiment of the present disclosure includes a face image input layer, a face key-point position detection module, four cascaded convolutional layer modules, a global average pooling layer module, a key-point feature information module, a feature vector connecting module, a fully connected layer, and a classifier.

The face image input layer is configured to input a face image.

The face key-point position detection module is configured to perform face key-point position detection on a face image to obtain face key-point position information.

The four cascaded convolutional modules are configured to sequentially perform feature processing on the input face image to obtain a feature response map output by the fourth convolutional module of the four cascaded convolutional modules.

The global average pooling layer module is configured to obtain a feature vector of a first dimension according to the input feature response map output by the fourth convolutional module.

The key-point feature information module is configured to perform key-point feature extraction on feature response maps output by the first three convolutional modules of the four cascaded convolutional modules respectively using the face key-point position information respectively to obtain key-point feature information of the response feature maps output by the first three convolutional modules respectively.

The feature vector connecting module is configured to connect the feature vector of the first dimension with the key-point feature information of the feature response maps output by the first three convolutional modules respectively to obtain a feature vector of a second dimension.

The fully connected layer module is configured to process the input feature vector of the second dimension to obtain a feature vector of a third dimension.

The classifier is configured to input the feature vector of the third dimension to a trained neural network classifier to output expression class information of the face image through the neural network classifier.

In an exemplary embodiment, the expression class information may include any one or more of happiness, surprise, calmness, sadness, anger, disgust, and fear. Other types of expressions may also be preset in the expression class information.

The algorithm structure of the expression recognition method is introduced above. The expression recognition method will now be introduced in detail.

In an exemplary embodiment, as shown in FIG. 1, the expression recognition method includes:

In S100, face key-point position detection is performed on a face image to obtain face key-point position information.

In S200, the face image is input to four cascaded convolutional modules, and feature processing is sequentially performed on the input face image to obtain a feature response map output by the fourth convolutional module of the four cascaded convolutional modules.

In S300, the feature response map output by the fourth convolutional module is input to a global average pooling layer module to obtain a feature vector of a first dimension.

In S400, key-point feature extraction is performed on feature response maps output by the first three convolutional modules of the four cascaded convolutional modules respectively using the face key-point position information to obtain key-point feature information of response feature maps output by the first three convolutional modules respectively.

In S500, the feature vector of the first dimension is connected to the key-point feature information of the feature response maps output by the first three convolutional modules respectively to obtain a feature vector of a second dimension.

In S600, the feature vector of the second dimension is input to a fully connected layer module and processed to obtain a feature vector of a third dimension.

In S700, the feature vector of the third dimension is input to a trained neural network classifier to output expression class information of the face image through the neural network classifier.

In an exemplary embodiment, S100 includes: performing face key-point position detection on the face image based on a Dlib library to acquire key-points of eyes and mouth in the face image as the face key-point position information.

Figure 3:
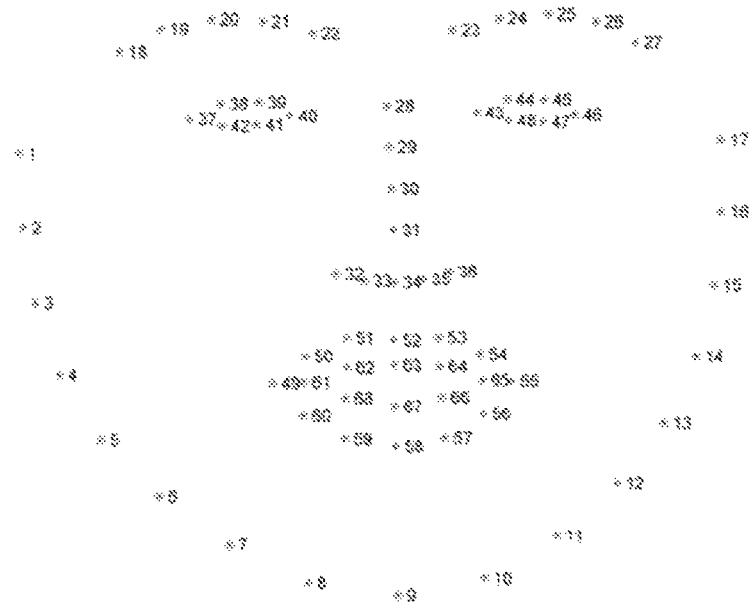
FIG. 3 is a schematic diagram of positions of face key-points according to an exemplary embodiment of the present disclosure.

The Dlib library is an integrated application library of image processing algorithms similar to OpenCV. Face key-point recognition is a type of highlighted function of the library. The face key-point position detection of the Dlib library is developed based on a random forest algorithm in machine learning, wherein positions of 68 key-points in a face may be described, as shown in FIG. 3, including eyebrows, eyes, nose, mouth, and lower jaw, and is relatively high in arithmetic speed. In an exemplary embodiment, in order to enable a deep learning network to focus on an expression feature better, a total of 32 key-points of the eyes and the mouth, which are most associated with an expression, may be selected from the 68 key-points as the face key-point position information.

In an exemplary embodiment, before S100, the step of the expression recognition method further includes: acquiring an input image, performing face detection on the input image, and a size of the detected face image is adjusted to a preset size.

In an exemplary embodiment, a face in the acquired input image may be correspondingly detected by the Dlib library, and the size of the detected face image may be changed to the preset size in a unified manner. The preset size may be set by a staff as practically required. No limits are made thereto in the present embodiment. Exemplarily, the preset size may be 48×48.

Figure 4:
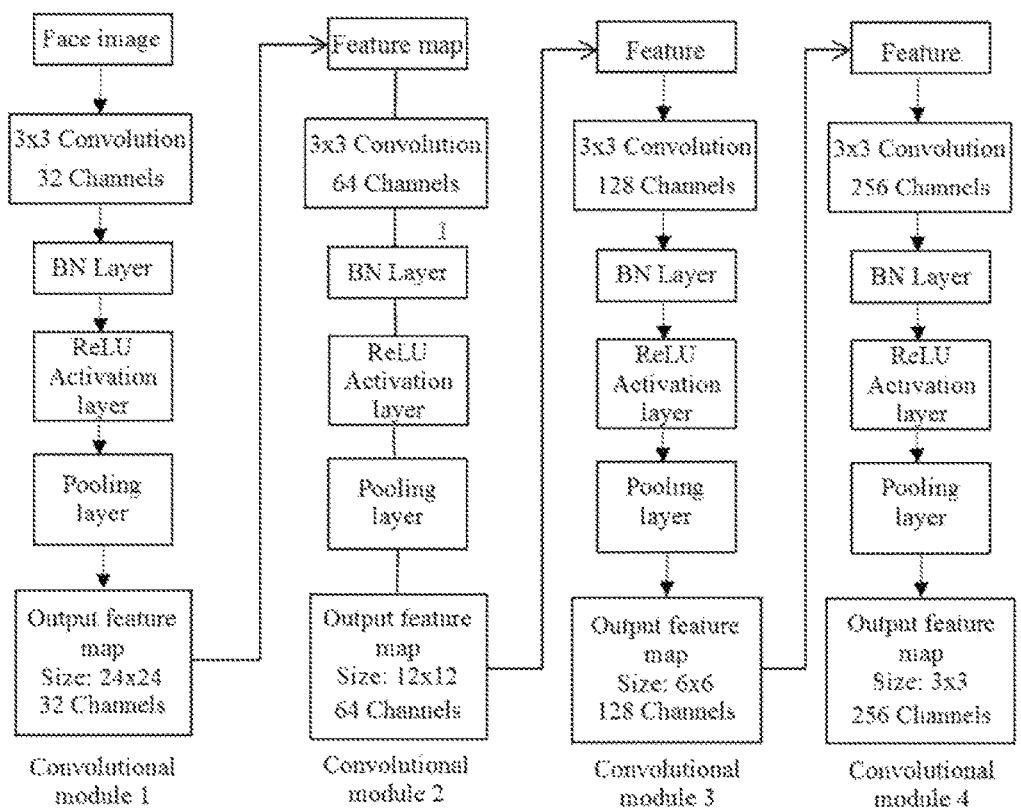
FIG. 4 is a structural schematic diagram of a convolutional module according to an exemplary embodiment of the present disclosure.

In an exemplary embodiment, in S200 as shown in FIG. 4, each convolutional module may include an input layer, a convolutional layer, a normalization layer (Batch Normalization (BN) layer shown in the figure), an activation function layer (a Rectified Linear Unit (ReLU) activation function is adopted in the present embodiment), a pooling layer, and an output layer.

In an exemplary embodiment, an input end of the convolutional layer is connected to the input layer. An input end of the normalization layer is connected to an output end of the convolutional layer. An input end of the activation function layer is connected to an output end of the normalization layer. An input end of the pooling layer is connected to an output end of the activation function layer. An input end of the output layer is connected to an output end of the pooling layer.

In an exemplary embodiment of the present disclosure, each convolutional module of the four cascaded convolutional modules plays a role of performing feature extraction on input feature response maps of different scales and outputting processed feature response maps.

In an exemplary embodiment, the four convolutional modules are arranged according to an order from top to bottom and defined as a first convolutional module 1, a second convolutional module 2, a third convolutional module 3, and a fourth convolutional module 4 respectively.

In an exemplary embodiment, the face image may be input to the first convolutional module 1 at first. As shown in FIG. 4, a size of the first convolutional module 1 includes a 3×3 convolution kernel and 32 channels. The face image (with a size of 48×48, for example) is processed through the first convolutional module to obtain a feature response map having a size of 24×24 and 32 channels. An output of the first convolutional module 1 is used as an input of the second convolutional module 2. The second convolutional module 2 includes a 3×3 convolution kernel and 64 channels. The 24×24 feature response map having 32 channels is input to the second convolutional module 2 and processed to obtain a feature response map having a scale of 12×12 and 64 channels. An output of the second convolutional module 2 is used as an input of the third convolutional module 3. The third convolutional module 3 includes a 3×3 convolution kernel and 128 channels. The 12×12 feature response map having 64 channels is input to the third convolutional module 3 and processed to obtain a feature response map having a scale of 6×6 and 128 channels, and an output of the third convolutional module 3 is used as an input of the fourth convolutional module 4. The fourth convolutional module 4 includes a 3×3 convolution kernel and 256 channels, and the 6×6 feature response map having 128 channels is input to the fourth convolutional module 4 and processed to obtain a feature response map having a scale of 3×3 256 channels.

In an exemplary embodiment, in S300, the global average pooling layer module plays a role of changing the feature response map output by the fourth convolutional module to the feature vector of the first dimension in an averaging manner. For example, the first dimension may be 1×256.

Figure 5:
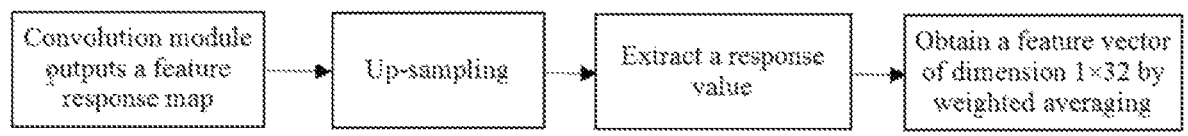
FIG. 5 is a schematic flowchart of performing key-point feature extraction on feature response maps of first three convolutional modules according to an exemplary embodiment of the present disclosure.

In an exemplary embodiment, in S400, as shown in FIG. 5, key-point feature extraction is performed by the key-point feature information module on the feature response maps output by the first three convolutional modules respectively using the face key-point position information. That is, key-point feature extraction is performed on the feature response maps output by the first convolutional module 1, the second convolutional module 2, and the third convolutional module 3 respectively, thereby obtaining key-point feature information of the feature response maps output by the first convolutional module 1, the second convolutional module 2, and the third convolutional module 3 respectively.

In an exemplary embodiment, S400 may include the following sub-steps:

Response values corresponding to the face key-point position information are extracted from the feature response map output by each convolutional module using the face key-point position information.

Weighted averaging is performed on the response values corresponding to the face key-point position information in each feature response map to obtain the key-point feature information of the feature maps output by the first three convolutional modules respectively.

In the exemplary embodiment of the present disclosure, the response values corresponding to the face key-point position information are respectively extracted from the feature response maps output by the first convolutional module 1, the second convolutional module 2, and the third convolutional module 3 respectively according to the face key-point position information obtained in the abovementioned step. That is, response values corresponding to a total of 32 key-points of the eyes and the mouth are extracted, and weighted averaging is performed on the response values corresponding to the key-points in the feature response maps to finally obtain a group of 32 response values corresponding to the feature response map output by each convolutional module. In the present example, the three convolutional modules output three feature vectors with a dimension 1×32.

In an exemplary embodiment, the key-point feature information is obtained through the following formula:

$$K_{i,j} = \frac{1}{N}\sum_{n=1}^{N} K_{i,j}^{n}.$$

Herein, $K_{i,j}$ is the key-point feature information, $K_{i,j}^{n}$ is a response value of the face key-point position information in an n-th channel in the feature response map, and N is the number of channels of the feature response map.

In an exemplary embodiment, before the step of extracting a response value corresponding to the face key-point position information from the feature response map output by each convolutional module using the face key-point position information, the expression recognition method further includes:

A size of the feature response map output by each convolutional module is adjusted to be the same as a size of the face image.

In an exemplary embodiment, the size of the feature response map output by each convolutional module may be adjusted to be the same as the size of the input face image through an up-sampling operation.

In an exemplary embodiment, in S500, the feature vector of the first dimension obtained in S300, is connected to the key-point feature information of the feature response maps output by the first three convolutional modules respectively to obtain the feature vector of the second dimension. For example, after the key-point feature information of the feature response maps output by the first three convolutional modules is extracted, the three feature vectors with a dimension of 1×32 are connected to the feature vector of the first dimension, thereby obtaining the feature vector of the second dimension. For example, the second dimension may be 1×352.

In an exemplary embodiment, in S600, the connection of each element of the output vector of the fully connected layer module with each element of the input vector may be implemented by fusing all features of the input vector. For example, after passing through the fully connected layer module, the feature vector of the first dimension output by the global average pooling layer module, is fused with the key-point feature information of the feature response maps output by the first three convolutional modules, thereby obtaining a feature vector of a third dimension. For example, an input of the fully connected layer module is the feature vector of the second dimension, while an output is the feature vector of the third dimension. The third dimension may be 1×128.

In an exemplary embodiment, in S700, the feature vector of the third dimension may be input to a softmax layer in a trained neural network to calculate a degree of confidence of each preset expression class. The degree of confidence may be obtained through the following formula:

$$P(y=j|x) = \frac{e^{x^T w_j}}{\sum_{k=1}^{K} e^{x^T w_k}}.$$

Herein, j is a sequence number of an expression class, x is an input vector of the softmax layer (i.e., the feature vector of the third dimension in the present embodiment), w is a network weight parameter, and P(y=j|x) is a degree of confidence that a corresponding expression class is a j-th expression class when the input vector of the softmax layer is x.

In an exemplary embodiment of the present disclosure, an expression class corresponding to the face image to be recognized may be determined according to the degree of confidence of each expression class. For example, the expression class corresponding to a maximum degree of confidence may be determined as the expression class corresponding to the face image.

In an exemplary embodiment, the neural network classifier may be obtained by training through a stochastic gradient descent method, including: acquiring a neural network to be trained and multiple face image samples preset with expression classes, acquiring and preprocessing a certain number of face image samples every time, inputting the preprocessed face image samples to the neural network to perform gradient descent iterative training until a preset training condition is satisfied, so as to obtain a trained neural network classifier. The preset training condition may include that an iteration count reaches a preset count, or a value of a loss function is less than a preset value. In an exemplary embodiment, a cross entropy may be used as the loss function.

In an exemplary embodiment, the preset expression class may include any one or more of happiness, surprise, calmness, sadness, anger, disgust, and fear. Alternatively, other numbers of expression classes and other expression classes may be preset.

According to the technical solution of the embodiment of the present disclosure, a purpose of performing corresponding expression recognition on the input face image is achieved using a mechanism of performing key-point feature extraction on a feature response map using face key-point position information, the structure is simple, few parameters are involved, and advantages of clear principle and simple design are achieved.

An exemplary embodiment of the present disclosure provides an expression recognition device, which includes:
a face key-point position detection module, configured to perform face key-point position detection on a face image to obtain face key-point position information;
four cascaded convolutional modules, configured to input the face image and sequentially perform feature processing on the input face image to obtain a feature response map output by the fourth convolutional module of the four cascaded convolutional modules;
a global average pooling layer module, configured to obtain a feature vector of a first dimension according to the input feature response map output by the fourth convolutional module;
a key-point feature information module, configured to perform key-point feature extraction on feature response maps output by the first three convolutional modules in the four cascaded convolutional modules respectively using the face key-point position information to obtain key-point feature information of the response feature maps output by the first three convolutional modules respectively;
a feature vector connecting module, configured to connect the feature vector of the first dimension with the key-point feature information of the feature response maps output by the first three convolutional modules respectively to obtain a feature vector of a second dimension;

a fully connected layer module, configured to process the input feature vector of the second dimension to obtain a feature vector of a third dimension; and a neural network classifier, configured to input the feature vector of the third dimension to the trained neural network classified to output expression class information of the face image through the neural network classifier.

An exemplary embodiment of the present disclosure provides a computer device, which includes a processor and a memory storing a computer program runnable in the processor. The processor executes the program to implement the expression recognition method as described in any of the abovementioned exemplary embodiments.

Figure 6:
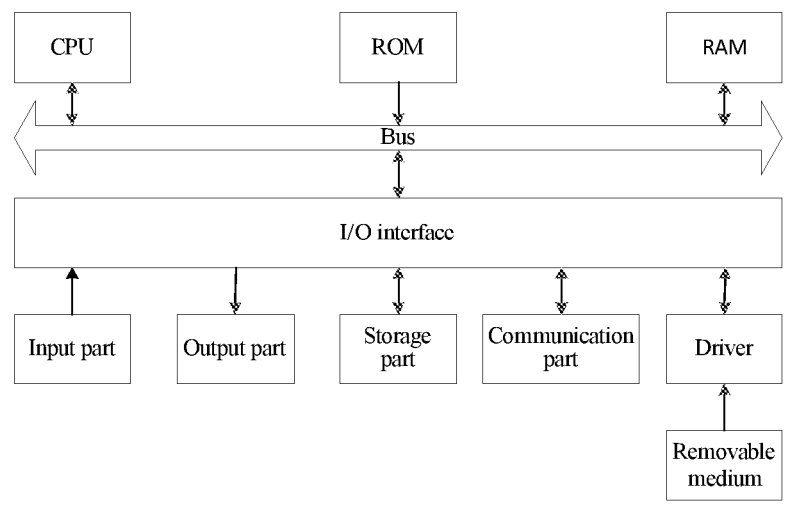
FIG. 6 is a structural schematic diagram of a computer device according to an exemplary embodiment of the present disclosure.

In an exemplary embodiment, as shown in FIG. 6, a computer system suitable for implementing the computer device provided in the embodiment of the present disclosure includes a Central Processing Unit (CPU), and may execute an appropriate operation and processing according to a program stored in a Read-Only Memory (ROM) or a program loaded from a storage part to a Random Access Memory (RAM). A program and data required by the operation of the computer system are also stored in the RAM. The CPU, the ROM, and the RAM are connected to one another through a bus. An Input/Output (I/O) interface is also connected to the bus.

The following components are connected to the I/O interface: an input part including a keyboard, a mouse, etc.; an output part including a Liquid Crystal Display (LCD), a speaker, etc.; the storage part including a hard disk, etc.; and a communication part including a Local Area Network (LAN) card and a network interface card of a modem, etc. The communication part executes communication processing through a network such as the Internet. A driver is also connected to the I/O interface as required. A removable medium, e.g., a magnetic disk, an optical disk, a magneto-optical disk, and a semiconductor memory, is installed in the driver as required such that a computer program read therefrom is installed in the storage part as required.

The processes described above with reference to the flowcharts may be implemented as computer software programs according to the embodiments of the present disclosure. For example, the embodiment of the present disclosure includes a computer program product, including a computer program which is physically included in a computer-readable medium and includes a program code used to execute the method shown in the flowchart. In such an embodiment, the computer program may be downloaded from the network and installed through the communication part, and/or installed from the removable medium.

The flowcharts and schematic diagrams in the drawings illustrate possible system architectures, functions, and operations of the system, method, and computer program product according to the embodiments of the present disclosure. In this regard, each block in the flowcharts or the schematic diagrams may represent part of a module, a program segment, or a code, and part of the module, the program segment, or the code includes one or more executable instructions used to implement a specified logical function. It is also to be noted that, in some alternative implementations, the functions marked in the blocks may also be implemented in an order different from those marked in the drawings. For example, two continuous blocks may actually be executed substantially concurrently, or may be executed in a reverse order sometimes, which is determined by the involved functions. It is further to be noted that each block in the schematic diagrams and/or the flowcharts and a combination of the blocks in the schematic diagrams and/or the flowcharts may be implemented by a dedicated hardware-based system configured to execute a specified function or operation, or may be implemented by a combination of a special hardware and a computer instruction.

A unit involved in an embodiment of the present disclosure may be implemented through software or hardware, or the described unit may be arranged in a processor. For example, it may be described that a processor includes a face key-point position detection module, four cascaded convolutional modules, a global average pooling layer module, etc. The names of these units do not form any limitation on the units in some cases.

As another aspect, an embodiment of the present disclosure further provides a non-transitory computer-readable storage medium. The computer-readable storage medium may be a computer-readable storage medium included in the device in the abovementioned embodiment, or a computer-readable storage medium that exists independently and is not installed in a terminal. The computer-readable storage medium stores one or more program which is used by one or more processor to execute the expression recognition method as described in the embodiments of the present disclosure.

The abovementioned embodiment of the present disclosure is only an example for clearly describing the present disclosure and not intended to limit the implementation modes of the present disclosure. Those of ordinary skills in the art may make variations or modifications of other different forms based on the above description. Not all implementation modes may be exhaustively listed herein. Any apparent variations or modifications derived from the technical solutions of the present disclosure still fall within the scope of protection of the present disclosure.

What is claimed is:

1. An expression recognition method, comprising the following steps:

performing face key-point position detection on a face image to obtain face key-point position information;

inputting the face image to four cascaded convolutional modules, and sequentially performing feature processing on the input face image to obtain a feature response map output by a fourth convolutional module of the four cascaded convolutional modules;

inputting the feature response map output by the fourth convolutional module to a global average pooling layer module to obtain a feature vector of a first dimension;

performing key-point feature extraction on feature response maps output by the first three convolutional modules of the four cascaded convolutional modules respectively using the face key-point position information to obtain key-point feature information of the response feature maps output by the first three convolutional modules respectively;

connecting the feature vector of the first dimension with the key-point feature information of the feature response maps output by the first three convolutional modules respectively to obtain a feature vector of a second dimension;

inputting the feature vector of the second dimension to a fully connected layer module, to process the feature vector of the second dimension to obtain a feature vector of a third dimension; and inputting the feature vector of the third dimension to a trained neural network classifier to output expression class information of the face image through the neural network classifier.

2. The expression recognition method according to claim 1, wherein
the performing the face key-point position detection on the face image to obtain the face key-point position information comprises:
performing the face key-point position detection on the face image based on a Dlib library to acquire key-points of eyes and mouth in the face image as the face key-point position information.

3. The expression recognition method according to claim 2, wherein
the neural network classifier is obtained by training through a stochastic gradient descent method.

4. The expression recognition method according to claim 3, wherein the stochastic gradient descent method comprises:
acquiring a neural network to be trained and a plurality of face image samples preset with expression classes, acquiring and preprocessing a certain number of face image samples every time, inputting the preprocessed face image samples to the neural network to perform gradient descent iterative training until a preset training condition is satisfied, so as to obtain the trained neural network classifier.

5. The expression recognition method according to claim 4, wherein
the preset training condition comprises that an iteration count reaches a preset count, or a value of a loss function is less than a preset value, wherein a cross entropy is used as the loss function.

6. The expression recognition method according to claim 1, wherein each convolutional module comprises an input layer, a convolutional layer, a normalization layer, an activation function layer, a pooling layer, and an output layer; and
an input end of the convolutional layer is connected to the input layer, an input end of the normalization layer is connected to an output end of the convolutional layer, an input end of the activation function layer is connected to an output end of the normalization layer, an input end of the pooling layer is connected to an output end of the activation function layer, and an input end of the output layer is connected to an output end of the pooling layer.

7. The expression recognition method according to claim 1, wherein
the performing the key-point feature extraction on the feature response maps output by the first three convolutional modules of the four cascaded convolutional modules respectively using the face key-point position information to obtain key-point feature information of the response feature maps output by the first three convolutional modules respectively comprises:
extracting response values corresponding to the face key-point position information from the feature response map output by each convolutional module using the face key-point position information; and
performing weighted averaging on the response values corresponding to the face key-point position information in each feature response map to obtain the key-point feature information of the feature maps output by the first three convolutional modules respectively.

8. The expression recognition method according to claim 7, wherein
the key-point feature information is obtained through the following formula:

$$K_{i,j} = \frac{1}{N}\sum_{n=1}^{N} K_{i,j}^{n},$$

where $K_{i,j}$ is the key-point feature information, $K_{i,j}^{n}$ is a response value of the face key-point position information in an n-th channel in the feature response map, and N is the number of channels of the feature response map.

9. The expression recognition method according to claim 7,
before the step of extracting the response values corresponding to the face key-point position information from the feature response map output by each convolutional module using the face key-point position information, the method further comprises:
adjusting a size of the feature response map output by each convolutional module to be the same as a size of the face image.

10. The expression recognition method according to claim 1,
before the step of performing the face key-point position detection on the face image to obtain the face key-point position information, the method further comprises:
acquiring an input image, performing face detection on the input image, and adjusting a size of the detected face image to a preset size.

11. The expression recognition method according to claim 1, wherein
the neural network classifier is trained by a stochastic gradient descent method.

12. The expression recognition method according to claim 1, wherein the inputting the feature vector of the second dimension to the fully connected layer module, to process the feature vector of the second dimension to obtain the feature vector of the third dimension, comprises:
connecting each element of an output vector of the fully connected layer module with each element of the feature vector of the second dimension by fusing all features of the feature vector of the second dimension to obtain the feature vector of the third dimension.

13. The expression recognition method according to claim 12, wherein
the third dimension is 1×128.

14. The expression recognition method according to claim 1, wherein
inputting the feature vector of the third dimension to the trained neural network classifier to output the expression class information of the face image through the neural network classifier, comprises:
inputting the feature vector of the third dimension to a softmax layer in the trained neural network to calculate a degree of confidence of each preset expression class.

15. The expression recognition method according to claim 14, wherein
the degree of confidence may be obtained through the following formula:

$$P(y=j|x) = \frac{e^{x^T w_j}}{\sum_{k=1}^{K} e^{x^T w_k}}$$

wherein j is a sequence number of an expression class, x is the feature vector of the third dimension, w is a network weight parameter, and P(y=j|x) is a degree of confidence that a corresponding expression class is a j-th expression class when the input vector of the softmax layer is x.

16. The expression recognition method according to claim 14, further comprising:
   determining an expression class corresponding to the face image according to the degree of confidence of each expression class.

17. The expression recognition method according to claim 16, wherein determining the expression class corresponding to the face image according to the degree of confidence of each expression class, comprises:
   determining an expression class corresponding to a maximum degree of confidence as the expression class corresponding to the face image.

18. A computer device, comprising a processor and a memory storing a computer program runnable in the processor, wherein the processor executes the program to implement the method according to claim 1.

19. A non-transitory computer-readable storage medium in which instructions are stored, wherein when the computer-readable storage medium is run on a computer, the computer is enabled to execute the method according to claim 1.

20. An expression recognition apparatus, comprising: a processor and a storage device, wherein the storage device is configured to store processor-executable programs, and the programs comprise:
   a face key-point position detection module, configured to perform face key-point position detection on a face image to obtain face key-point position information;
   four cascaded convolutional modules, configured to input the face image and sequentially perform feature processing on the input face image to obtain a feature response map output by a fourth convolutional module of the four cascaded convolutional modules;
   a global average pooling layer module, configured to obtain a feature vector of a first dimension according to the input feature response map output by the fourth convolutional module;
   a key-point feature information module, configured to perform key-point feature extraction on feature response maps output by the first three convolutional modules of the four cascaded convolutional modules respectively using the face key-point position information to obtain key-point feature information of the response feature maps output by the first three convolutional modules respectively;
   a feature vector connecting module, configured to connect the feature vector of the first dimension with the key-point feature information of the feature response maps output by the first three convolutional modules respectively to obtain a feature vector of a second dimension;
   a fully connected layer module, configured to process the input feature vector of the second dimension to obtain a feature vector of a third dimension; and
   a neural network classifier, configured to input the feature vector of the third dimension to a trained neural network classifier to output expression class information of the face image through the neural network classifier.

* * * * *